United States Patent [19]

Dolby

[11] 4,281,217

[45] Jul. 28, 1981

[54] APPARATUS AND METHOD FOR THE IDENTIFICATION OF SPECIALLY ENCODED FM STEREOPHONIC BROADCASTS

[76] Inventor: Ray M. Dolby, 50 Walnut St., San Francisco, Calif. 94118

[21] Appl. No.: 19,666

[22] Filed: Mar. 12, 1979

Related U.S. Application Data

[63] Continuation-in-part of Ser. No. 890,498, Mar. 27, 1978, abandoned.

[51] Int. Cl.³ .............................................. H04H 5/00
[52] U.S. Cl. .............................. 179/1 GN; 179/1 GB; 370/110; 455/70
[58] Field of Search ............ 179/1 GN, 1 GM, 1 GB, 179/15 BY; 325/64, 36; 340/171 R, 171 A, 147 F; 370/110, 76, 119; 455/70

[56] References Cited

U.S. PATENT DOCUMENTS

| | | | |
|---|---|---|---|
| 2,617,923 | 11/1952 | Rekart | 325/64 |
| 3,061,783 | 10/1962 | Noller | 325/64 |
| 3,845,391 | 10/1974 | Crosby | 455/70 |
| 3,867,700 | 2/1975 | Wycoff | 325/64 |
| 3,908,090 | 9/1975 | Kahn | 325/36 |
| 4,016,366 | 4/1977 | Kurata | 179/1 GN |

Primary Examiner—Douglas W. Olms
Attorney, Agent, or Firm—Limbach, Limbach & Sutton

[57] ABSTRACT

A sub-audible in-band tone system is disclosed for identifying an FM stereophonic radio broadcast which is specially encoded, as with dynamic range improvement encoding or quadraphonic encoding, for example. A constant frequency pilot tone is added at a low level (e.g. at −70dB) to the transmitted signal at or near the upper frequency limit of the audio frequency spectrum (15 kHz). The audio spectrum is not notched or otherwise altered to accommodate the tone. FM stereophonic receivers detect the pilot tone by heterodyning the received tone with a stable mixing signal at 15.2 kHz derived from the 19 kHz FM stereo pilot tone. The shifted frequency tone is passed to a low frequency narrow band detector which can control a visual display and switch in appropriate signal decoding circuitry when the tone is detected.

28 Claims, 2 Drawing Figures

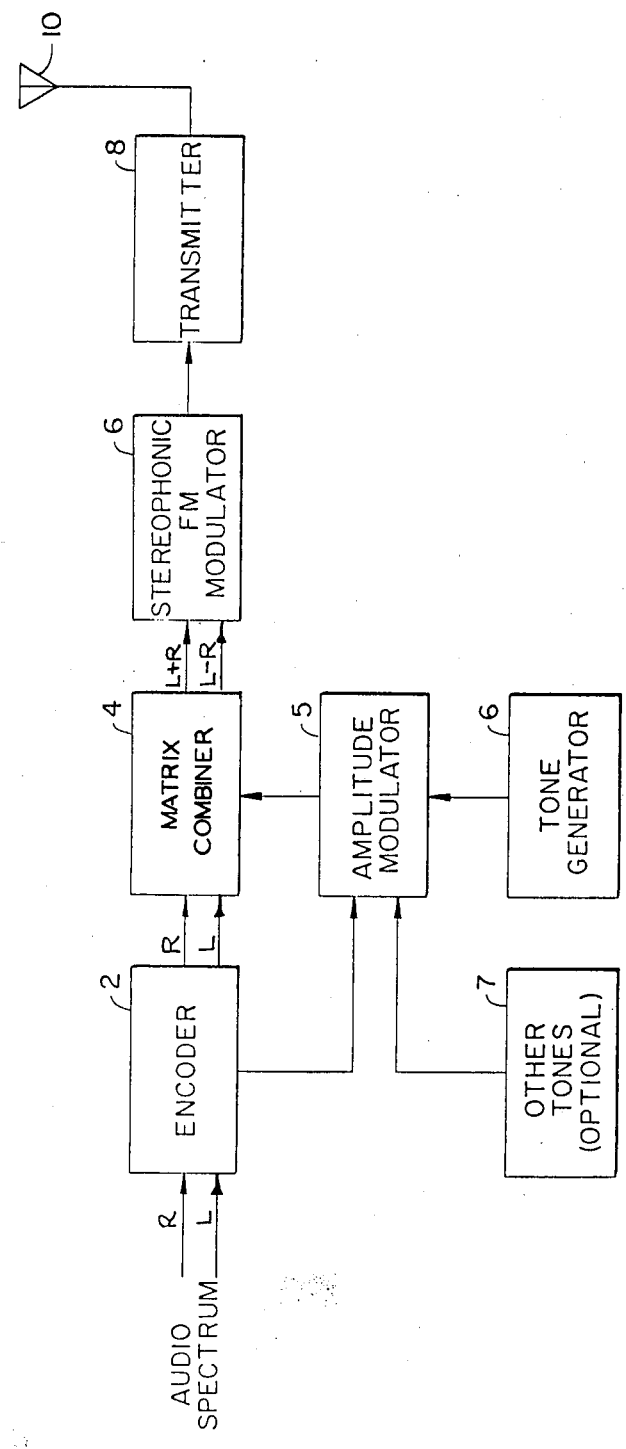
FIG._1

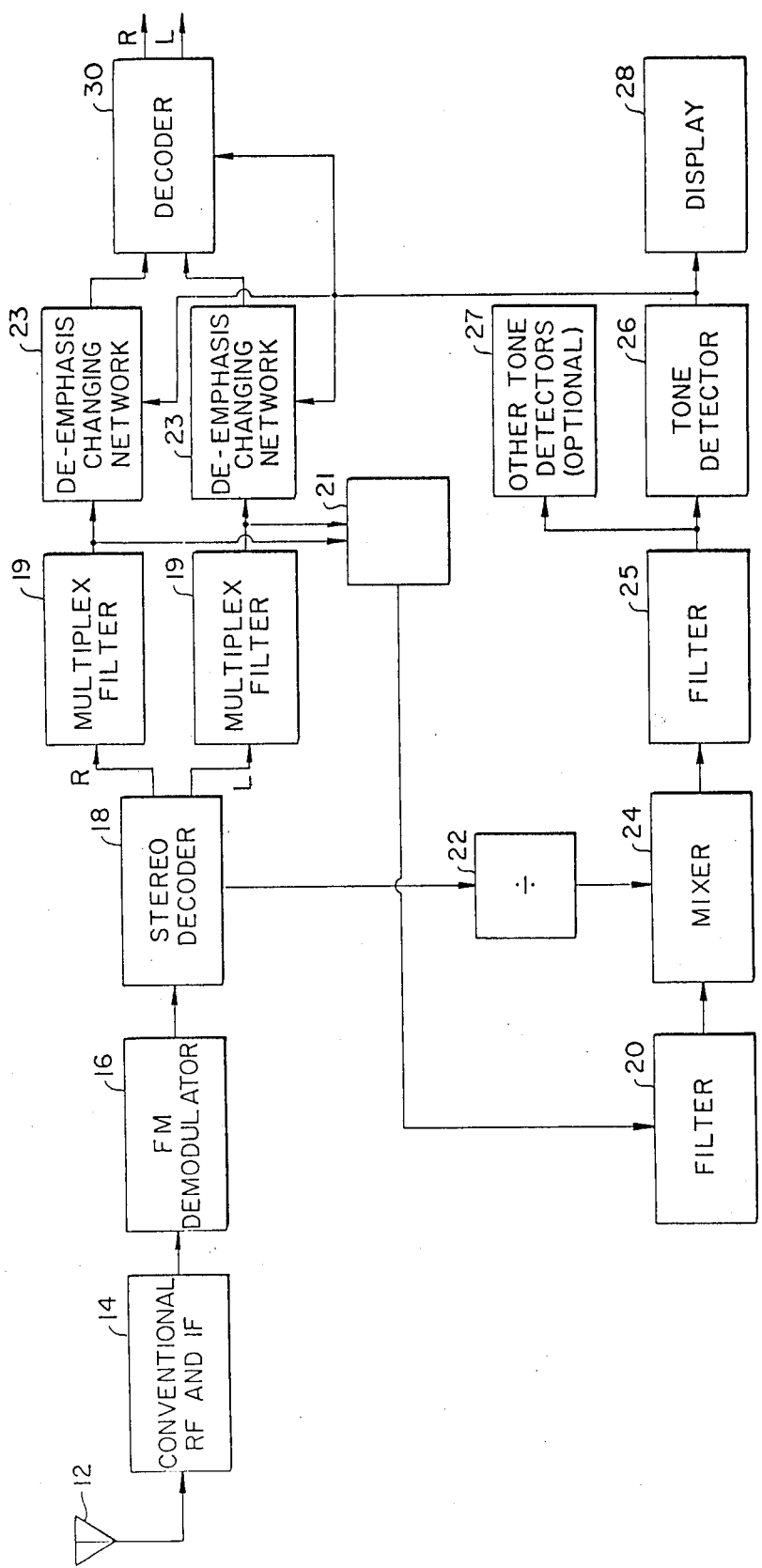
FIG._2.

APPARATUS AND METHOD FOR THE IDENTIFICATION OF SPECIALLY ENCODED FM STEREOPHONIC BROADCASTS

This application is a continuation-in-part of my copending application Ser. No. 890,498, now abandoned filed Mar. 27, 1978.

BACKGROUND OF THE INVENTION

This invention relates to radio broadcasting and more particularly to a system for identifying an FM stereophonic broadcast which has been specially encoded.

In recent years an increasing number of FM stereophonic broadcast stations in the United States and other countries have incorporated an encoding technique in their transmissions known commercially as Dolby FM encoding, which includes the use of Dolby B-type compression, a type of high-frequency compression, and the use of 25 microsecond pre-emphasis in place of the conventional 75 microsecond pre-emphasis. Details of Dolby FM encoding are set forth in the articles "Optimum Use of Noise Reduction in FM Broadcasting," by Ray M. Dolby, *Journal of the Audio Engineering Society*, June 1973, vol. 21, No. 5, pp. 357-362 and "Dolby B-Type Noise Reduction for FM Broadcasts," by D. P. Robinson, *Journal of the Audio Engineering Society*, June 1973, vol. 21, No. 5, pp. 351-356. At the same time, growing numbers of FM stereophonic receiving devices are being equipped with the complementary Dolby decoder. A problem encountered by users of such receiving equipment is that there is no positive way to determine if a particular station is actually transmitting the specially encoded signal. Usually, the user relies on a listing of stations known to be broadcasting the specially encoded signals and accordingly switches in the decoder based on a belief that the listing is accurate and up to date.

Therefore, a system for identifying specially encoded broadcasts so that the user can readily recognize such broadcasts and switch in the decoder or so that the receiving device can automatically switch in the decoder while indicating reception of such a broadcast, by a lamp for example, is highly desirable.

Such a system should preferably fall within the parameters of a standard FM stereophonic broadcast in order to simplify implementation. The audio signal must not be affected in any way, such as by notching of the spectrum. The system must also have a low circuit cost while maintaining high operating reliability. The system should preferably accommodate more than one separately identifiable mode so that other encoded functions (e.g. quadraphonic) may be controlled.

SUMMARY OF THE INVENTION

The invention uses an identification tone which is transmitted within the audio frequency spectrum but at a sufficiently low level that the tone is below the permissible measured noise level of the broadcast signal and, in any case, below audibility. A frequency high in the audio band (i.e. about 15 kHz) is chosen so that a relatively small amount of signal energy is present in a narrow bandwidth centered on that frequency during the broadcast of normal audio material. A high frequency further minimizes the possibility of the tone being heard, since the human ear has a relatively poor response at very high frequencies.

It is important that the detector system in the receiver should be sufficiently selective that the program material does not need to be notched at the frequency of the pilot tone, thereby avoiding degradation of the program. However, to detect the pilot tone directly at a high frequency would normally require a sophisticated and expensive narrow-band detector. Heretofore such a possibility has not been considered to be practicable or economically feasible. Therefore, it is the purpose of the present invention to achieve such a result in practical receivers simply and inexpensively. This is done by employing the dependable frequency stability of the 19 kHz stereophonic pilot to derive a mixing signal which is used to heterodyne the portion of the audio spectrum containing the identification tone to a low frequency where a phase locked loop or other similar detector can be used at a very narrow effective bandwidth.

The frequency relationships are chosen to permit the use of a mixing signal readily derived from the 19 kHz stereophonic pilot tone. In particular, advantage is taken of the fact that a 76 kHz tone, derived from the 19 kHz pilot, is available in phase-locked loop stereo decoders. It happens that when this tone is simply divided by five the result is the very convenient frequency of 15.2 kHz, which is at the upper edge of the pass-band of the sharp 15 kHz low-pass filters conventionally employed in FM audio chains. Thus, for example, if the identification tone is set at 15.0 kHz, the beat frequency is 200 Hz, a 75-fold reduction in frequency. A practical lock-in range for a phase locked loop is a few percent. Thus if a phase-locked loop is set for 200 Hz±10%, the effective detection band of the system is 15 kHz±20 Hz (and 15.4 kHz±20 Hz). Similarly, identification tones can be placed at, say, 15.1 kHz, 14.9 kHz, and so on; the tones can also be placed above 15.2 kHz, such as at 15.3 or 15.4 kHz.

Frequencies very near 15.2 kHz can also be used. A frequency of 15.16 kHz would result in a 40 Hz tone, giving a ±4 Hz detection band, a selectivity improvement of 375 times over that of a direct-acting phase-locked loop. A frequency of 40 Hz would yield an adequately fast response time and yet it would not be subject to interference by 50 Hz and 60 Hz power line frequencies. Other similarly advantageous frequencies can also be found.

The level of the tone is chosen to be so low as to be inaudible, yet high enough to reduce the expense of recovery. A level of about 70 dB below 100% modulation (referred to 400 Hz) meets this requirement.

A further feature of the invention employs optional amplitude modulation of the tone, whereby a low amplitude such as −70 dB is used in the absence of high frequency signals; in the presence of such signals the level is increased according to some function of the high frequency signal level, so as to be as high as possible for ease of detection, but totally masked by the signal. In the case of Dolby FM encoding, the DC control signals of the two Dolby B circuits provide a suitable control for such a modulation system. The two control signals can be summed, or a circuit for selecting the higher of the two can be used.

These and other advantages will be further appreciated as the following detailed description and related drawings are read.

BRIEF DESCRIPTION OF THE DRAWINGS

FIG. 1 is a block diagram of the transmission portion of a system embodying the invention.

FIG. 2 is a block diagram of the reception portion of a system embodying the invention.

DESCRIPTION OF THE PREFERRED EMBODIMENTS

Referring now to the drawings and particularly to FIG. 1 thereof, where the transmission portion of a system embodying the invention is shown, the audio spectrum is applied to an encoder 2, which may be of the type sold commercially as the Dolby FM encoder. The encoded baseband, (L+R) audio spectrum is derived and summed in matrix combiner 4 with an identification tone which is a low amplitude high frequency audio tone generated by tone generator 6. The signal which modulates the 38 kHz multiplex subcarrier (L−R) may optionally be used instead of the baseband; in this case a notch may optionally be placed in the L−R signal at the identification tone frequency for ease of signal recovery. This has the effect of reducing to monophonic any signals in the region of the identification tone, which may be audibly permissible. Generator 6 is crystal controlled or otherwise stabilized so that the pilot tone has a frequency stability of the 19 kilohertz stereophonic pilot signal. If necessary, one or more further similar identification tones for other functions may be provided by generator 7.

In order to facilitate detection in the receiver, optional amplitude modulator 5, actuated by control signal 3, increases the level of the identification tone whenever high level, high frequency components are present in the audio signals. The control signal may be generated by appropriate filtering and rectifying circuitry or it may be derived from the control signal of the Dolby FM encoder unit 2.

The audio spectrum and in-band tone are then applied to a conventional stereophonic FM modulator 6 and conventional transmitter 8 for transmission from antenna 10.

The amplitude of tone generator 6 is adjusted to provide a tone on the order of 70 dB below the level of 100% modulation at low frequencies. The tone frequency is chosen to be at or near the upper frequency limit of about 15 kilohertz. While a frequency significantly greater than this is technically possible, its use would be complicated by the presence of the sharp 15 kHz low-pass filters employed in the stereophonic FM modulator 6 or in other circuits or transmission systems between matrix combiner 4 and transmitter 8. The tone frequency choice also affects the ability to use a readily derived mixing signal in the receiver to heterodyne the pilot tone to a frequency easily acquired by a simple detector.

In FIG. 2, the reception portion of a system embodying the invention is shown in the environment of a FM stereophonic tuner or receiver.

A received FM stereo signal from antenna 12 is applied to conventional RF and IF means 14 to provide the type of signal required by a conventional FM demodulator 16 which generates as its output the 38 kHz modulated information (L−R), the baseband (L+R) audio spectrum, and the 19 kHz stereophonic pilot tone. Decoder 18 is preferably a phase locked loop type decoder of the type commonly used in present FM stereophonic receiving devices. Such decoders multiply the 19 kHz pilot tone by 4 in order to generate two phases of the pilot tone. This 76 kHz signal already present in the decoder 18 is applied to a divider 22, which divides by five in this preferred embodiment to provide a stable 15.2 kHz signal for mixer (multiplier) 24. If decoder 18 does not have a 76 kHz signal present derived from the 19 kHz stereo pilot, a suitable multiplier can be provided for this purpose.

The signal outputs of the stereo decoder are passed through low-pass multiplex filters 19 in order to reject spurious components. The identification tone is preferably tapped off at this point by processing the L and R audio signals from filters 19. Advantage is thus taken of the multiplex filters to reduce spurious cross modulation products generated in mixer 24. The signals are combined in combiner 21 by additively combining if the transmitter applied the tone to the L+R baseband signal or by subtractively combining if the transmitter applied the tone to the L−R subcarrier signal.

Filter 20 receives the combiner 21 output and filters out at least all low frequencies (e.g. below 500 Hz). In practice it may be a band-pass filter centered at the frequency shifted identification tone frequency. When the filter output signal is beat with a 15 kHz identification tone, for example, the difference tone is heterodyned to 200 Hz.

Mixer 24 is operated to generate the difference of the applied signals; thus its output is the filtered demodulated output of demodulator 16 shifted by the 15.2 kHz mixing signal from divider 22—that is, 200 Hz. Filter 25 is a band-pass filter designed to attenuate all unwanted modulation products from the mixer output.

Tone detector 26 receiving this signal has a range of acceptance on the order of ±10% or 20 Hz at the 200 Hz tone frequency. Such an acceptance range is achieved in simple and inexpensive phase locked loops, using components of ordinary tolerance. While such a detector with ±20 Hz acceptance range is readily implemented at a low frequency such as 200 Hz, a detector with such an acceptance range at the original 15 kHz pilot tone frequency would not be economically feasible.

When detector 26 has sensed the presence of a substantially 200 Hz tone for a length of time sufficient for the phase locked loop to lock, an indication signal is provided to display 28, which can be a panel lamp on the receiving device, for example, and to decoder 30 which switches in the decoder circuitry to decode the audio signals from stereo decoder 18. For a system using Dolby FM encoding, the decoder 30 is a complementary Dolby B Type decoder and means 23 for changing the de-emphasis time constant from 75 microseconds (or 50 microseconds) to 25 microseconds. Alternately, the decoder 30 can be manually switched by the user in response to seeing the display 28. Detector 26 preferably includes an integrator, which may be linear or non-linear in operation, so that false triggering is avoided. Also, brief interference with the tone, from momentary bursts of coherent signals which may be at the identification tone frequency, should not extinguish the indication signal. Linking operation of the tone indicator circuitry to the operation of the stereo indicator light is helpful in suppressing false indications, particularly when changing stations.

The system described is applicable to other types of special encoding of FM stereophonic broadcasts. For example, other identification tone frequencies such as 14.9 kHz, detected by detector 27, can be used for indicating the transmission of quadraphonically encoded signals.

I claim:

1. In an FM stereophonic reception apparatus having means for demodulating and decoding an FM stereophonic broadcast signal to provide audio signals and an FM stereophonic pilot signal, circuitry for indicating the reception of a specially encoded FM stereophonic broadcast signal having an audio identification tone in said audio signals to identify the presence of special encoding, said tone having an amplitude below audibility at a high frequency at or near the upper frequency limit of the audio signals, comprising means receiving said audio signals and said stereophonic pilot signal for generating a signal having a frequency shifted audio spectrum containing said identification tone shifted to a low frequency equal to a frequency near the lower frequency limit of the audio signals, and means for detecting the frequency shifted identification tone to generate a special encoding identification signal.

2. The combination of claim 1 wherein said means for generating a frequency shifted audio spectrum includes means for processing said audio signals to generate a signal having a spectrum including said identification tone at said high frequency, means for generating a mixing signal in response to said stereo pilot signal, the frequency of said mixing signal selected to provide a difference frequency equal to the desired frequency shifted identification tone frequency when the difference frequency of the mixing signal and high frequency identification tone is generated, and means for generating the difference frequencies of said processed audio signals and said mixing signal.

3. The combination of claim 2 wherein said means for processing comprises means for linearly combining said audio signals to provide a combined signal, and means for filtering said combined signal to pass the high frequency identification tone substantially unattenuated and to suppress at least the frequencies substantially equal to the frequency of said frequency shifted identification tone.

4. The combination of claims 1, 2 or 3 wherein said means for detecting the frequency shifted identification tone is responsive only to frequencies within about ±10% of the frequency of said frequency shifted identification tone.

5. The combination of claim 4 wherein said means for detecting the frequency shifted identification tone includes a phase locked loop having a center frequency equal to the frequency of the frequency shifted identification tone for generating a locked signal in response to said frequency shifted identification tone.

6. The combination of claim 5 wherein said means for detecting the frequency shifted identification tone further includes means for generating said special encoding identification signal in response to said locked signal.

7. The combination of claim 1 wherein said means for detecting the frequency shifted identification tone to generate a special encoding identification signal includes a visual display on said reception apparatus for signifying the reception of said high frequency identification tone.

8. The combination of claim 6 wherein the means for generating said special encoding identification signal includes a visual display on said reception apparatus for signifying the reception of said high frequency identification tone.

9. The combination of claim 1 wherein the high frequency identification tone has a frequency in the range of 12 kHz through 18 kHz.

10. The combination of claim 1 wherein the frequency shifted identification tone has a frequency in the range of 10 Hz through 3 kHz.

11. The combination of claim 2 wherein said mixing signal has a frequency which is the result of multiplying and dividing said stereophonic pilot signal by whole integers.

12. The combination of claim 11 wherein the resulting mixing signal has a frequency of 15.2 kilohertz.

13. A system for identifying a specially encoded FM stereophonic broadcast signal in which an audio identification tone is applied to the audio signals, said tone having an amplitude below audibility at a high frequency at or near the upper frequency limit of the audio signals comprising FM stereophonic transmitter means, said means including means for combining said audio signals with said high frequency identification tone, and FM stereophonic reception means, said means including means receiving said audio signals and stereophonic pilot signal for generating a signal having a frequency shifted audio spectrum containing said identification tone shifted to a low frequency equal to a frequency near the lower frequency limit of the audio signals, and means for detecting the frequency shifted identification tone to generate a special encoding identification signal.

14. The combination of claim 13 wherein said FM stereophonic transmitter means further comprises means for modulating the amplitude level of said high frequency identification tone to increase the amplitude level of said tone when substantial high frequency energy is present in the audio signals.

15. A method for identifying a specially encoded FM stereophonic broadcast signal in which an audio identification tone is applied to the audio signals, said tone having an amplitude below audibility at a high frequency at or near the upper frequency limit of the audio signals comprising demodulating the broadcast signal to provide the audio signals and stereophonic pilot signal, generating from said audio signals and stereophonic pilot signal a signal having a frequency shifted audio spectrum containing said identification tone shifted to a low frequency equal to a frequency near the lower frequency limit of the audio signals, detecting the frequency shifted identification tone, and generating a special encoding identification signal in response to detection of the frequency shifted identification tone.

16. In an FM stereophonic broadcast system, apparatus for identifying a specially encoded FM stereophonic broadcast signal in which an audio identification tone is applied to the audio signals, said tone having an amplitude below audibility at a high frequency at or near the upper frequency limit of the audio signals, comprising means for combining said audio signals with said identification tone, and means for modulating the amplitude level of said identification tone to increase the amplitude level of said tone when substantial high frequency energy is present in said audio signals.

17. The combination of claim 16 wherein the special encoding includes high frequency compression and a 25 microsecond pre-emphasis, said system including apparatus for providing said high frequency compression and 25 microsecond pre-emphasis, said apparatus generating a control signal indicative of the high frequency energy in the audio signals, the combination further comprising means for applying said control signal to said amplitude level modulating means to control said identification tone amplitude level.

18. In a stereophonic FM transmission system, a method for providing an identification of specially encoded transmissions comprising continuously generating an identification signal having a frequency in the audio spectrum, said frequency having the characteristics that it is in the range of 12 kHz through 18 kHz in the upper frequency range of the transmission system, and when mixed with a mixing frequency derived by multiplying and dividing the stereophonic subcarrier pilot signal frequency by whole integers it provides a low frequency signal in the range of 10 Hz through 3 kHz, and transmitting said identification signal at an amplitude in the order of 70 dB below 100% modulation when there are no signals in said upper frequency range, whereby the identification signal is sufficiently low as not to be heard when the transmission is reproduced.

19. The combination of claim 18 further comprising the step of modulating the amplitude of said identification signal in accordance with the information energy in the proximity of the frequency of said signal.

20. The combination of claim 18 further comprising the steps of deriving a mixing signal from the stereophonic subcarrier pilot signal, heterodyning said identification signal with said mixing signal to shift said identification signal to a frequency in said range of 10 Hz through 3 kHz, and detecting said frequency shifted signal.

21. The combination of claim 20 wherein said step of deriving a mixing signal comprises the steps of multiplying said pilot signal by four and dividing the multiplied signal by five.

22. The combination of claim 1 wherein the audio identification tone is carried in the L+R baseband signal.

23. The combination of claim 2 wherein the audio identification tone is carried in the L−R subcarrier signal.

24. The combination of claim 3 wherein the audio identification tone is carried in the L+R baseband signal and wherein said means for linearly combining sums the left and right audio signals.

25. The combination of claim 3 wherein the audio identification tone is carried in the L−R subcarrier signal and wherein said means for linearly combining forms the difference of said left and right audio signals.

26. The combination of claim 16 wherein said means for combining combines said identification tone with the L+R baseband signal.

27. The combination of claim 16 wherein said means for combining combines said identification tone with the L−R subcarrier signal.

28. The combination of claims 2 or 3 wherein said means for processing includes multiplex filter means.

* * * * *